(12) United States Patent
Asada et al.

(10) Patent No.: US 11,703,967 B2
(45) Date of Patent: Jul. 18, 2023

(54) DISPLAY PANEL AND MANUFACTURING METHOD WITH IMPROVED LIGHT TRANSMITTANCE FROM OPENING IN INSULATION LAYER

(71) Applicant: Sharp Display Technology Corporation, Kameyama (JP)

(72) Inventors: Katsushige Asada, Kameyama (JP); Hajime Imai, Kameyama (JP); Yoshihito Hara, Kameyama (JP); Akihiro Shohraku, Kameyama (JP); Isao Ogasawara, Kameyama (JP); Yuki Yamashita, Kameyama (JP)

(73) Assignee: SHARP DISPLAY TECHNOLOGY CORPORATION, Kameyama (JP)

( * ) Notice: Subject to any disclaimer, the term of this patent is extended or adjusted under 35 U.S.C. 154(b) by 0 days.

(21) Appl. No.: 17/568,872

(22) Filed: Jan. 5, 2022

(65) Prior Publication Data
US 2022/0236820 A1    Jul. 28, 2022

(30) Foreign Application Priority Data
Jan. 26, 2021   (JP) .................................. 2021-010377

(51) Int. Cl.
| | | |
|---|---|---|
| G06F 3/041 | (2006.01) | |
| G06F 3/044 | (2006.01) | |
| G02F 1/1343 | (2006.01) | |
| G02F 1/1333 | (2006.01) | |
| G02F 1/1362 | (2006.01) | |

(52) U.S. Cl.
CPC ........ *G06F 3/0412* (2013.01); *G02F 1/13338* (2013.01); *G02F 1/13439* (2013.01); *G02F 1/136295* (2021.01); *G06F 3/0445* (2019.05); *G06F 3/0418* (2013.01)

(58) Field of Classification Search
CPC .. G06F 3/0412; G06F 3/0445; G02F 1/13338; G02F 1/13439; G02F 1/136295
See application file for complete search history.

(56) References Cited

U.S. PATENT DOCUMENTS

| | | | |
|---|---|---|---|
| 2016/0253023 A1 | 9/2016 | Aoyama et al. | |
| 2017/0160852 A1* | 6/2017 | Ahn ........................ | G06F 3/047 |
| 2018/0046289 A1* | 2/2018 | Hao ...................... | G06F 3/0443 |

(Continued)

FOREIGN PATENT DOCUMENTS

WO    2016/136271 A1    9/2016

*Primary Examiner* — Liliana Cerullo
(74) *Attorney, Agent, or Firm* — Keating & Bennett, LLP

(57) ABSTRACT

A display panel includes a common electrode formed in an upper layer above a data line, a first insulating layer covering the common electrode, a touch sensor line formed in an upper layer of the first insulating layer and in a first opening provided in the first insulating layer, and connected to the common electrode via the first opening, a second insulating layer covering the touch sensor line, and a pixel electrode formed in an upper layer of the second insulating layer. The first insulating layer is formed with a second opening between the common electrode and the pixel electrode. The second insulating layer is disposed in an interior of the second opening and formed with a recessed portion recessed downward into a portion above the second opening. At least a portion of the pixel electrode is disposed in the recessed portion of the second insulating layer.

10 Claims, 15 Drawing Sheets

(56) References Cited

U.S. PATENT DOCUMENTS

2020/0033976 A1* 1/2020 Yin .................. G02F 1/134309
2020/0257176 A1* 8/2020 Zhang ................ G02F 1/13439
2021/0200358 A1* 7/2021 Kim ..................... H01L 27/323

* cited by examiner

DISPLAY PANEL AND MANUFACTURING METHOD WITH IMPROVED LIGHT TRANSMITTANCE FROM OPENING IN INSULATION LAYER

CROSS-REFERENCE TO RELATED APPLICATIONS

This application claims the benefit of priority to Japanese Patent Application Number 2021-010377 filed on Jan. 26, 2021. The entire contents of the above-identified application are hereby incorporated by reference.

BACKGROUND

Technical Field

The present disclosure relates to a display panel with a touch sensor function and a manufacturing method of a display panel with a touch sensor function.

There have been known display panels with a full in-cell touch sensor function and manufacturing methods of a display panel with a full in-cell touch sensor function. Such a manufacturing method of a display panel with a touch sensor function is disclosed in, for example, WO 2016/136271.

In the display panel with a touch sensor function of WO 2016/136271 described above, a pixel electrode, a first insulating film, a sensor electrode line, a second insulating film, a common electrode, a third insulating film, and a data signal line are formed in this order from a liquid crystal layer side. Then, a plurality of slits are provided in the pixel electrode, and the display panel is configured to drive the liquid crystal by generating a transverse electrical field between the pixel electrode in the upper layer and the common electrode in the lower layer. As a result, noise from the data signal line disposed in a lower layer below the common electrode is electrical-field-shielded by the common electrode, preventing the noise from the data signal line from reaching the pixel electrode.

Further, in the display panel of WO 2016/136271 described above, the sensor electrode line and the common electrode are connected via a through hole formed in the second insulating film. As a result, a distance between the sensor electrode line and the common electrode can be ensured, making it possible to reduce a parasitic capacitance between the sensor electrode line and the common electrode. Further, the first insulating film is formed covering the sensor electrode line in order to insulate the pixel electrode and the sensor electrode line. Thus, at least the first insulating film and the second insulating film are disposed between the pixel electrode and the common electrode.

SUMMARY

With the display panel with a touch sensor function set forth in WO 2016/136271 described above, while the noise from the data signal line (data line) can be prevented from reaching the pixel electrode and the parasitic capacitance between the sensor electrode line and the common electrode can be reduced, the first insulating film and the second insulating film are disposed between the pixel electrode and the common electrode. As a result, a distance between the pixel electrode and the common electrode increases, resulting in the problem that a strong electrical field effect on the liquid crystal cannot be acquired, reducing a light transmittance of the display panel (liquid crystal layer).

Thus, in order to solve the problems described above, it is an object of the present disclosure to provide a display panel with a touch sensor function and a manufacturing method of a display panel with a touch sensor function that improve a light transmittance of the display panel while preventing noise from a data line from reaching a pixel electrode and reducing a parasitic capacitance between a sensor electrode line (touch sensor line) and a common electrode.

To solve the problems described above, a display panel with a touch sensor function according to a first aspect of the present disclosure includes a data line, a common electrode formed in an upper layer above the data line, a first insulating layer covering at least a portion of the common electrode, a touch sensor line formed in an upper layer of the first insulating layer and in a first opening provided in the first insulating layer, and connected to the common electrode via the first opening, a second insulating layer covering at least a portion of the touch sensor line, and a pixel electrode formed in an upper layer of the second insulating layer. The first insulating layer is formed with a second opening between the common electrode and the pixel electrode, the second insulating layer is disposed in an interior of the second opening, and formed with a recessed portion recessed downward into a portion above the second opening, and at least a portion of the pixel electrode is disposed in the recessed portion of the second insulating layer.

A manufacturing method of a display panel with a touch sensor function according to a second aspect includes forming a data line on a substrate, forming a common electrode in an upper layer above the data line, forming a first insulating layer covering at least a portion of the common electrode, forming a first opening and a second opening in the first insulating layer, forming a touch sensor line in an upper layer of the first insulating layer and in the first opening provided in the first insulating layer and thus connecting the touch sensor line and the common electrode through the first opening, forming a second insulating layer covering at least a portion of the touch sensor line and in the second opening and thus forming a recessed portion in a portion above the second opening, and forming a pixel electrode in an upper layer of the second insulating layer with at least a portion of the pixel electrode being disposed in the recessed portion of the second insulating layer.

According to the configuration described above, a light transmittance of a display panel can be improved, while preventing noise from a data line from reaching a pixel electrode and reducing a parasitic capacitance between a touch sensor line and a common electrode.

DESCRIPTION OF EMBODIMENTS

Figure 1:
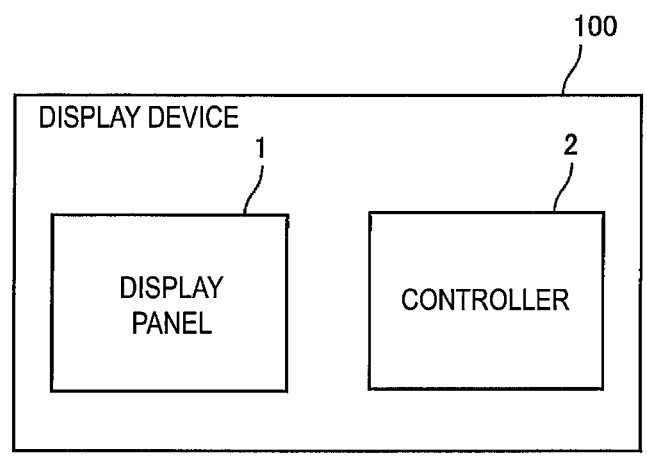
FIG. 1 is a block diagram illustrating a configuration of a display device according to a first embodiment.

Hereinafter, embodiments of the present disclosure will be described in detail with reference to the drawings. In the drawings, the same or corresponding portions are denoted by the same reference numerals and signs, and the description thereof will not be repeated. Note that, for ease of description, in the drawings referred to below, configurations may be simplified or schematically illustrated, and some components may be omitted. Further, dimensional ratios between components illustrated in the drawings are not necessarily indicative of actual dimensional ratios.

First Embodiment

A configuration of a display device 100 according to a first embodiment will be described. FIG. 1 is a block diagram illustrating the configuration of the display device 100 according to the first embodiment. As illustrated in FIG. 1, the display device 100 includes a display panel 1 with a touch sensor function (hereinafter referred to as "display panel 1") and a controller 2.

The display panel 1 has a function of displaying a video or an image, and a function of detecting a touch and a touch position from an indicator. The display panel 1 is a full in-cell type touch panel. The controller 2 executes each control process in the display device 100 on the basis of the touch position acquired from the display panel 1.

Figure 2:
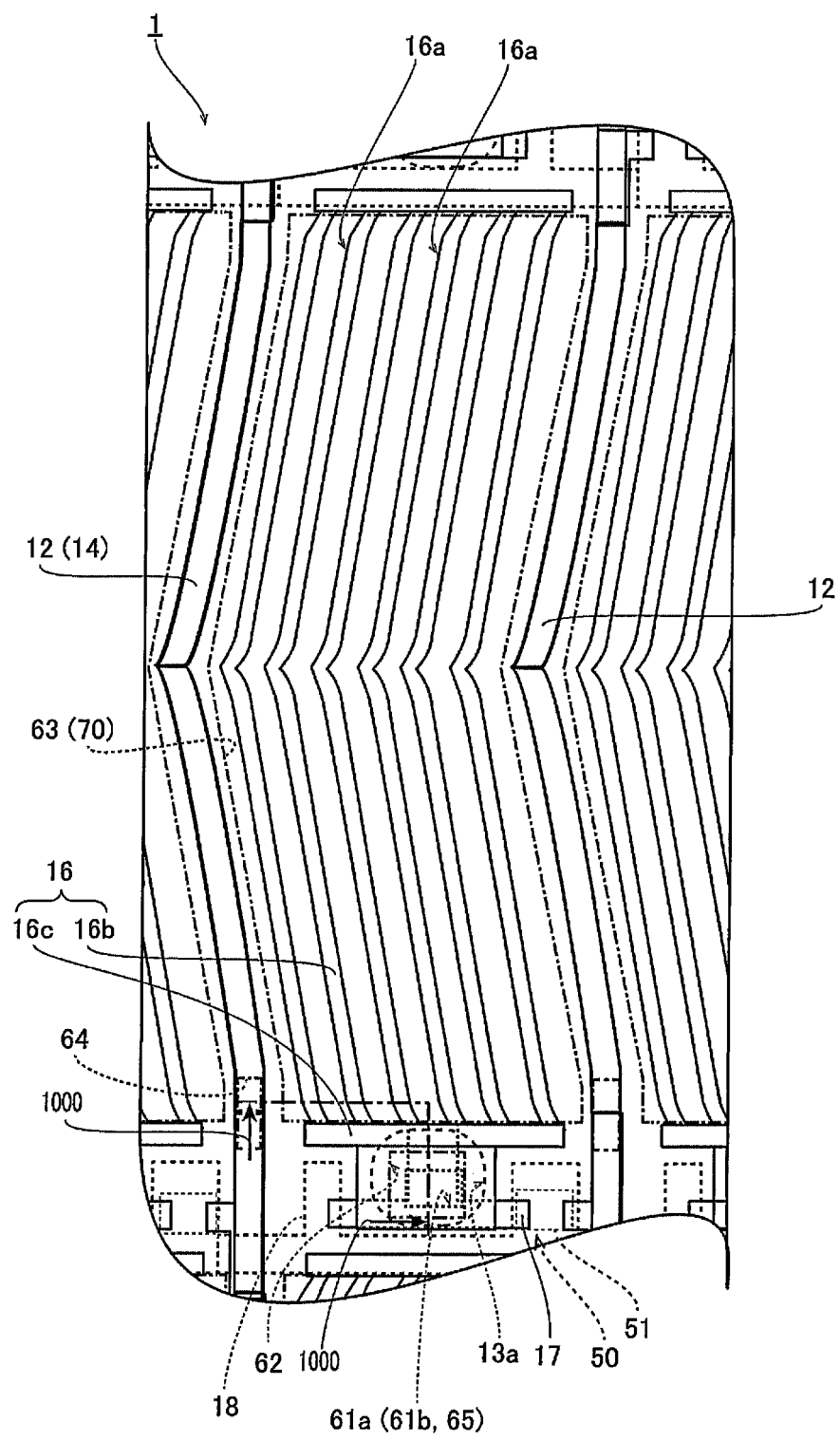
FIG. 2 is a plan view of a portion of a display panel.
Figure 3:
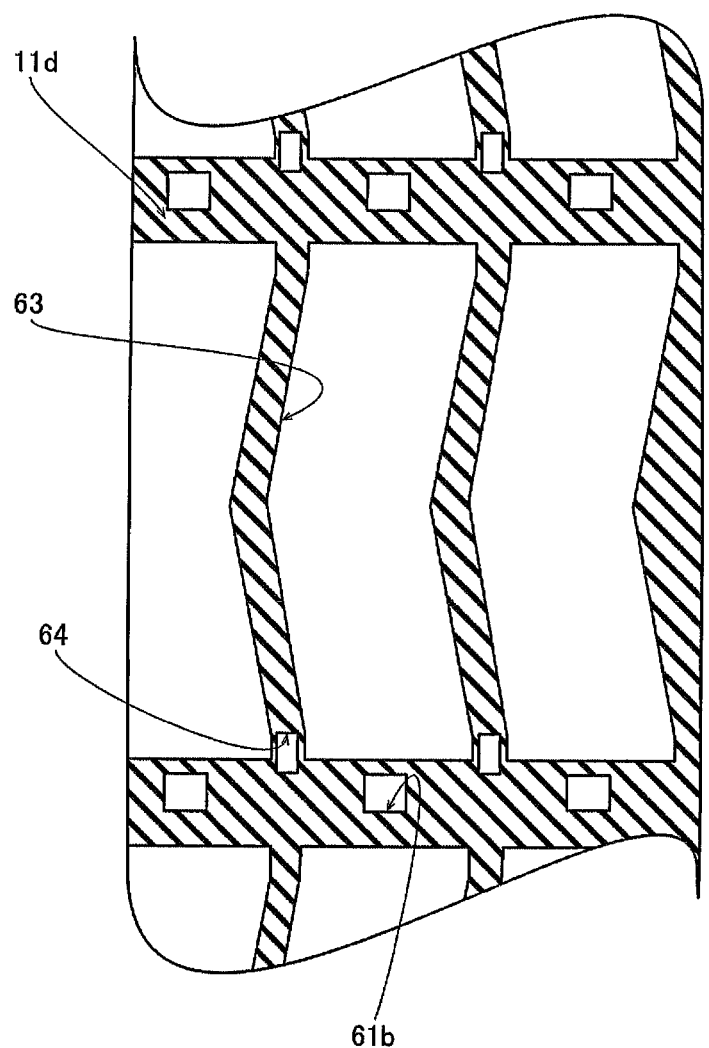
FIG. 3 is a plan view of a first insulating layer according to the first embodiment.
Figure 4:
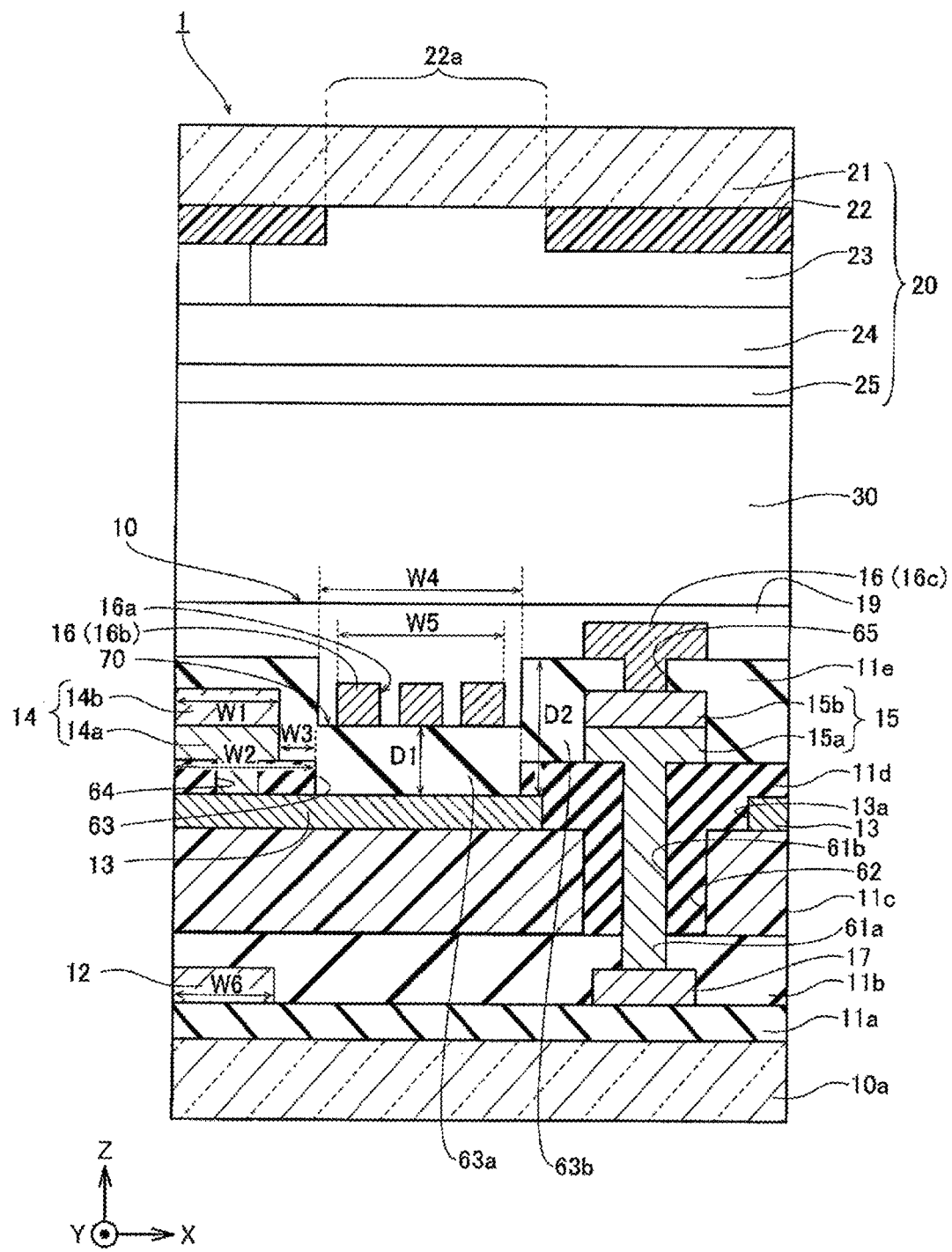
FIG. 4 is a cross-sectional view taken along the line 1000-1000 in FIG. 2.

FIG. 2 is a plan view schematically illustrating a portion of the display panel 1. Further, FIG. 3 is a plan view illustrating a configuration of a first insulating layer 11d of the display panel 1. Further, FIG. 4 is a cross-sectional view taken along the line 1000-1000 in FIG. 2. As illustrated in FIG. 4, the display panel 1 includes an active matrix substrate 10, a counter substrate 20, and a liquid crystal layer 30 interposed between the active matrix substrate 10 and the counter substrate 20. A user visually recognizes an image from a front face (hereinafter, touch surface) side of the counter substrate 20. Further, the display panel 1 receives a touch operation by, for example, a finger (indicator) on the touch surface.

As illustrated in FIG. 4, a glass substrate 21, a black matrix 22, a color filter 23, a transparent fixed layer 24, and an alignment film 25 are disposed on the counter substrate 20 in this order from the touch surface side. An opening 22a is provided in the black matrix 22, and the opening 22a functions as a light-transmitting portion that transmits light from the liquid crystal layer 30 side to the touch surface side.

Configuration of Active Matrix Substrate

As illustrated in FIG. 4, the active matrix substrate 10 is provided with a glass substrate 10a, a gate line 18 (refer to FIG. 5), a gate insulating layer 11a, a data line 12 and a drain electrode 17, a data line insulating layer 11b, an organic insulating layer 11c, a common electrode 13, the first insulating layer 11d, a touch sensor line 14 and a connecting electrode 15, a second insulating layer 11e, a pixel electrode 16, and an alignment film 19, in this order from the side opposite to the liquid crystal layer 30. Note that, in the following description, "upper" refers to a Z direction in FIG. 4, and refers to the liquid crystal layer 30 side in the active matrix substrate 10. Further, "lower" refers to the side opposite to the Z direction in FIG. 4, and refers to the glass substrate 10a side in the active matrix substrate 10.

An electrical field is generated between the pixel electrode 16 and the common electrode 13, thereby driving the liquid crystal molecules contained in the liquid crystal layer 30. A plurality of slits 16a are provided in the pixel electrode 16, and the liquid crystal molecules are driven by a transverse electrical field driving method. The common electrode 13 is provided in common to a plurality of the pixel electrodes 16. Further, the common electrode 13 functions not only as a counter electrode of the pixel electrode 16, but is connected to the touch sensor line 14 (lower electrode layer 14a) and functions as a touch sensor electrode as well. Note that the slit 16a provided in the pixel electrode 16 need not necessarily be provided in a plurality to one pixel electrode 16, and at least one slit 16a need only be provided.

Figure 5:
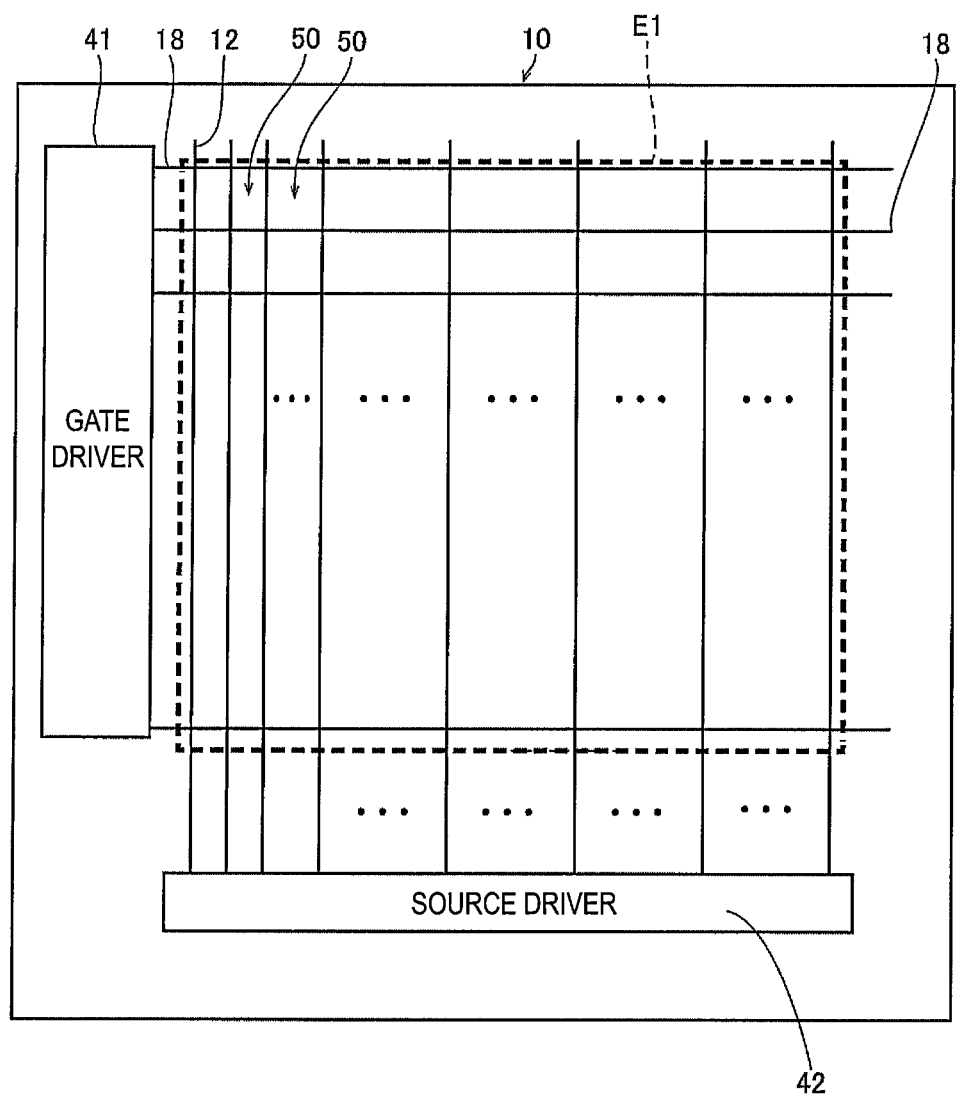
FIG. 5 is a schematic plan view of an active matrix substrate.

FIG. 5 is a plan view schematically illustrating a configuration of the active matrix substrate 10. The active matrix substrate 10 is provided with a gate driver 41 and a source driver 42. A plurality of the gate lines 18 and a plurality of the data lines 12 intersect each other and are formed in a lattice pattern in plan view. Further, as illustrated in FIG. 2, the active matrix substrate 10 is provided with a thin film transistor 50 connected to the plurality of gate lines 18 and the plurality of data lines 12.

Figure 6:
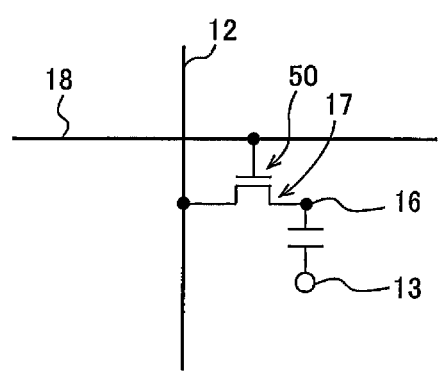
FIG. 6 is a circuit diagram for explaining a connection relationship between a thin film transistor and a gate line as well as a data line.

FIG. 6 is a schematic circuit diagram for explaining the connection between the thin film transistor 50 and the gate line 18 as well as the data line 12. As illustrated in FIG. 6, a gate electrode of the thin film transistor 50 is connected to the gate line 18, and a source electrode of the thin film transistor 50 is connected to the data line 12. Further, the drain electrode 17 of the thin film transistor 50 is connected to the pixel electrode 16.

As illustrated in FIG. 5, the plurality of gate lines 18 connect each of the thin film transistors 50 connected to the plurality of pixel electrodes 16 and the gate driver 41. Further, the plurality of data lines 12 connect each of the thin film transistors 50 connected to the plurality of pixel electrodes 16 and the source driver 42. Further, the gate driver 41 and the source driver 42 are each disposed in a frame region outside of a display region E1 in which the plurality of pixel electrodes 16 are disposed. The gate driver 41 and the source driver 42 are constituted by an integrated circuit, for example. The gate driver 41 supplies gate signals (scanning signals) sequentially to each of the plurality of gate lines 18. Specifically, the gate driver 41 sequentially applies voltage to (scans) the plurality of gate lines 18 on the basis of a horizontal synchronization signal from the controller 2. The source driver 42 supplies a data signal (source signal) to each of the plurality of data lines 12.

Figure 7:
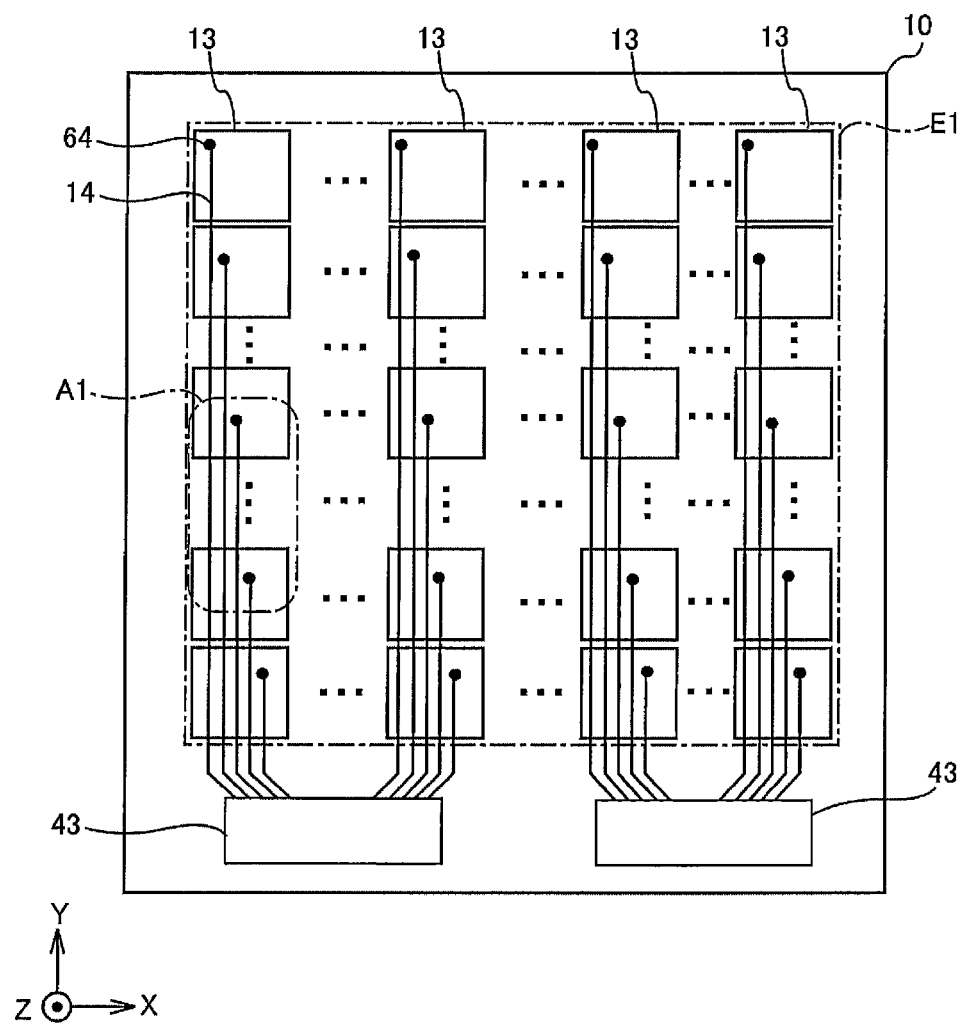
FIG. 7 is a schematic plan view for explaining a connection between a common electrode and a touch sensor line.

FIG. 7 is a plan view schematically illustrating the configuration of the active matrix substrate 10 in a layer different from that in FIG. 5. The active matrix substrate 10 includes a touch detection driver 43. The touch detection driver 43 is constituted by an integrated circuit, for example. The touch detection driver 43 and the common electrodes 13 are respectively connected via the touch sensor line 14. The touch detection driver 43 transmits a drive signal to each of the common electrodes 13 and receives a signal from each of the common electrodes 13. Then, the touch detection driver 43 detects a touch position by an indicator (a finger, for example) on the basis of the received signal.

Figure 8:
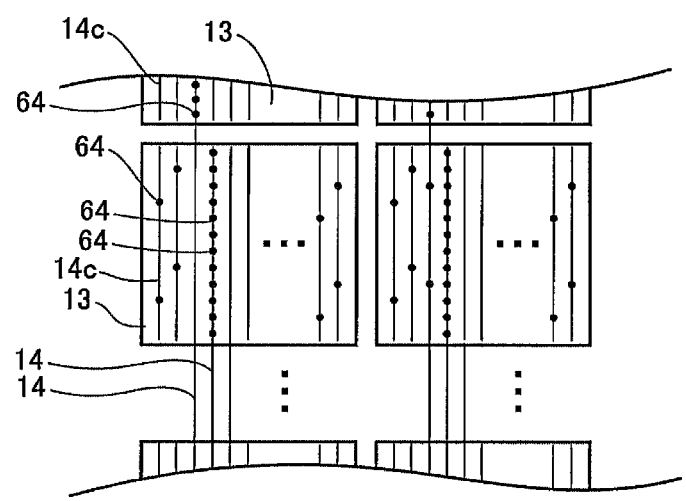
FIG. 8 is an enlarged view of a region A1 in FIG. 7.

FIG. 8 is an enlarged view of a region A1 in FIG. 7. As illustrated in FIG. 8, the touch sensor line 14 is connected to the common electrode 13 at a plurality of locations (openings 64). Further, a dummy wiring line 14c is provided in an upper layer above the common electrode 13 at a position different from that of the touch sensor line 14 in plan view. The dummy wiring line 14c extends parallel to the touch sensor line 14 and is not directly connected to the touch detection driver 43. Note that the state in which the dummy wiring line 14c is not directly connected to the touch detection driver 43 includes a state in which, for example, the dummy wiring line 14c is electrically connected to the touch detection driver 43 with the common electrode 13 and the touch sensor line 14 interposed therebetween. Further, the touch sensor line 14 is disposed across the plurality of common electrodes 13 while the dummy wiring line 14c is disposed on a single common electrode 13. The plurality of lines of the dummy wiring line 14c and the touch sensor line 14 are formed in the same manufacturing process. Then, lines of the plurality of lines other than the lines that function as the touch sensor lines 14 are cut at boundaries of the plurality of common electrodes 13, thereby forming the dummy wiring lines 14c. As a result, the common electrode 13 and a plurality of the dummy wiring lines 14c connected to the common electrode 13 can be made electrically independent from the dummy wiring lines 14c of the other common electrodes 13.

Then, the dummy wiring line 14c is constituted by, for example, copper (Cu) having a resistance value smaller than that of indium tin oxide (ITO) of the common electrode 13. Then, the dummy wiring line 14c and the common electrode 13 are connected via the opening 64. As a result, when the dummy wiring line 14c and the common electrode 13 are viewed as one segment, the resistance value of the segment can be made small compared to a case in which the dummy wiring line 14c is not provided. Further, as illustrated in FIG. 8, the plurality of dummy wiring lines 14c are disposed in parallel at equal intervals and in alignment with the touch sensor line 14 on the common electrode 13. In this way, differences in the shapes of the common electrodes 13 in plan view can be reduced. Specifically, in each of the common electrodes 13, the touch sensor line 14 and the plurality of dummy wiring lines 14c are similarly disposed in parallel, and thus the shape of the light-transmitting portion between the touch sensor line 14 and the dummy wiring line 14c, and the shape of the light-transmitting portion between the plurality of dummy wiring lines 14c are equal to each other. As a result, an optical difference (transmittance change) of each line (RGB pixel) can be eliminated, and a color shift can be prevented. This effect is particularly significant when viewing the common electrode 13 from a planar oblique direction.

Configuration of Each Layer in Active Matrix Substrate

As illustrated in FIG. 4, the gate insulating layer 11a is formed in an upper layer of the glass substrate 10a. The gate insulating layer 11a is formed covering the gate line 18 (refer to FIG. 5). The gate insulating layer 11a is formed of an inorganic insulating film, and is formed of, for example, silicon nitride (SiNx) or silicon oxide ($SiO_2$). Further, the gate line 18 is formed of a metal film.

The data line 12 and the drain electrode 17 are formed over the gate insulating layer 11a and are formed of a metal film.

The data line insulating layer 11b is formed covering the data line 12 and the drain electrode 17. The data line insulating layer 11b is formed of an inorganic insulating film, and is formed of, for example, silicon nitride (SiNx) or silicon oxide ($SiO_2$). An opening 61a in which a portion of the connecting electrode 15 formed in the same layer as that of the touch sensor line 14 is disposed is provided in the data line insulating layer 11b above the drain electrode 17. The opening 61a is formed in a position that does not overlap the opening 22a of the black matrix 22 in plan view.

The organic insulating layer 11c is formed on the data line insulating layer 11b. Further, a thickness of the organic insulating layer 11c is preferably not less than 1 μm and not greater than 4 μm. Here, the thicker the organic insulating layer 11c, the greater the insulating performance and the smaller the parasitic capacitance between the data line 12 and the common electrode 13, making it possible to improve the sensitivity of the touch panel. In this regard, the film thickness of the organic insulating layer 11c is preferably 1 μm or greater. However, as a disadvantage of making the thickness thicker, patterning becomes difficult, and thus the film thickness of the organic insulating layer 11c is preferably 4 μm or less. Further, an opening 62 in which a portion of the first insulating layer 11d is disposed is provided in the organic insulating layer 11c above the drain electrode 17.

The common electrode 13 is formed on the organic insulating layer 11c. The common electrode 13 is formed of, for example, a transparent conductive film (indium tin oxide (ITO), for example). The common electrode 13 is formed in an upper layer above the data line 12 and in a lower layer below the pixel electrode 16. Further, the common electrode 13 is provided with an opening 13a in which the first insulating layer 11d is disposed. The opening 13a is formed in a position overlapping the openings 61a and 61b, the opening 62, and an opening 65 in plan view, as illustrated in FIG. 2.

Figure 9:
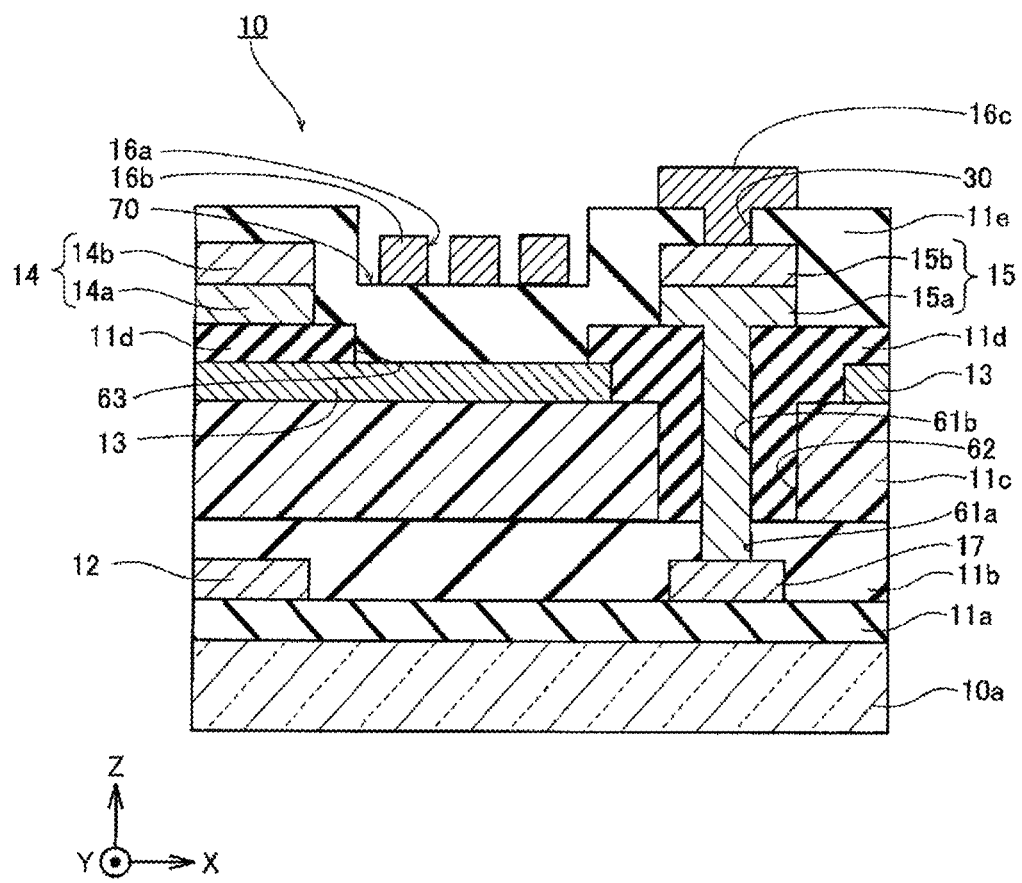
FIG. 9 is a cross-sectional view of the display panel at a position where a touch sensor electrode and the common electrode are not connected.

As illustrated in FIG. 4, the first insulating layer 11d covers at least a portion of the common electrode 13, and is formed in the opening 13a and in the opening 62. The first insulating layer 11d is formed of an inorganic insulating film, and is formed of, for example, silicon nitride (SiNx) or silicon oxide ($SiO_2$). FIG. 9 is a cross-sectional view of the active matrix substrate 10 at a position different in plan view from that of FIG. 4. As illustrated in FIG. 9, the first insulating layer 11d has a function of insulating the common electrode 13 and the touch sensor line 14 not connected to the common electrode 13. Further, a film thickness of the first insulating layer 11d is preferably not less than 150 nm and not greater than 500 nm. Here, the thicker the first insulating layer 11d, the greater the insulating performance and the smaller the parasitic capacitance between the common electrode 13 and the touch sensor line 14 not connected to the common electrode 13, making it possible to improve the sensitivity of the touch panel. In this regard, the film thickness of the first insulating layer 11d is preferably 150 nm or greater. However, as a disadvantage of making the thickness thicker, patterning becomes difficult, and thus the film thickness of the first insulating layer 11d is preferably 500 nm or less. Further, in the first embodiment, an opening 63 in which the second insulating layer 11e is disposed is formed in the first insulating layer 11d, between the common electrode 13 and the pixel electrode 16.

Further, the opening 61b is formed above the drain electrode 17 in the first insulating layer 11d. The opening 61b is continuous in a vertical direction with the opening 61a of the data line insulating layer 11b. Further, as illustrated in FIG. 4, the opening 64 in which a portion of the touch sensor line 14 connected to the common electrode 13 is disposed is formed in the first insulating layer 11d above the common electrode 13. Further, as illustrated in FIG. 3, the opening 61b, the opening 63, and the opening 64 are formed separately from each other in plan view. Further, as illustrated in FIG. 4, the opening 63 is not provided in a portion where the common electrode 13 is not disposed in plan view. As a result, in a portion where the common electrode 13 is not disposed, the distance between the data line 12 and the pixel electrode 16 is small, making it possible to prevent the parasitic capacitance between the data line 12 and the pixel electrode 16 from becoming large.

As illustrated in FIG. 4, the touch sensor line 14 is formed in an upper layer of a portion of the first insulating layer 11d and in the opening 64 in the first insulating layer 11d. Then, the touch sensor line 14 is connected to the common electrode 13 via the opening 64. Further, in plan view, the touch sensor line 14 is connected to one common electrode 13 (refer to FIG. 7) of the plurality of common electrodes 13, and is not connected to the other common electrodes 13.

Here, in a direction orthogonal to a thickness direction (Z direction) of the display panel 1 and in a width direction (X direction) orthogonal to a direction in which the touch sensor line 14 extends (Y direction), a length (width) W1 of the touch sensor line 14 is not greater than a length (width) W2 of the first insulating layer 11d. In the example of FIG. 4, the width W1 is less than the width W2, and a length (width) W3 of the first insulating layer 11d from the touch sensor line 14 to the opening 63 is greater than a dimension equivalent to four-ninths of the width W1, for example. According to this configuration, when the touch sensor line 14 is formed on the first insulating layer 11d, a shift in the touch sensor line 14 can be absorbed to the extent that the width W2 of the first insulating layer 11d is large. That is, the touch sensor line 14 can be easily aligned. Further, in the first embodiment, a width W4 of the opening 63 in the X direction is greater than a width W5 of a first portion 16b of the pixel electrode 16.

Further, the touch sensor line 14 is formed parallel to the data line 12, and a width W6 of the data line 12 is not greater than the width W1 of the touch sensor line 14. In the example of FIG. 4, the width W6 is less than the width W1. According to this configuration, the width W6 of the data line 12 is small, making it difficult for multiple reflection to occur between the touch sensor line 14 and the data line 12. As a result, unnecessary light transmission is reduced, making it possible to improve the contrast of the display panel 1 and suppress the occurrence of color unevenness.

Further, the touch sensor line 14 includes, for example, the lower electrode layer 14a and an upper electrode layer 14b. The lower electrode layer 14a and the upper electrode layer 14b are layered. The lower electrode layer 14a is disposed in the opening 64. The lower electrode layer 14a has a light reflectivity less than that of the upper electrode layer 14b. For example, the lower electrode layer 14a includes titanium (Ti). The upper electrode layer 14b includes, for example, copper (Cu). According to this configuration, the light reflection at the lower electrode layer 14a can be reduced, making it possible to suppress multiple reflection between the data line 12 and the touch sensor line 14 of light (backlight) incident from below the display panel 1. As a result, unnecessary coloring (color mixing) can be prevented when the display panel 1 is viewed obliquely from above. Thus, the size of the black matrix 22 required for color mixing prevention can be reduced, and the light transmittance of the display panel 1 can be further improved without reducing display quality.

The connecting electrode 15 has a function of electrically connecting the drain electrode 17 and the pixel electrode 16. The connecting electrode 15 is formed in an upper layer of a portion of the first insulating layer 11d, and in the opening 61b provided in the first insulating layer 11d and the opening 61a in the data line insulating layer 11b. Then, the connecting electrode 15 is connected to the drain electrode 17 via the openings 61a and 61b. Further, the connecting electrode 15 includes, for example, a lower electrode layer 15a and an upper electrode layer 15b. The lower electrode layer 15a and the upper electrode layer 15b are layered. The lower electrode layer 15a is formed in the same layer as that of the lower electrode layer 14a of the touch sensor line 14 and is formed of the same material. The upper electrode layer 15b is formed in the same layer as the upper electrode layer 14b of the touch sensor line 14 and is formed of the same material.

The second insulating layer 11e is formed covering at least a portion of the touch sensor line 14 and at least a portion of the connecting electrode 15. The second insulating layer 11e is formed of an inorganic insulating film, and is formed of, for example, silicon nitride (SiNx) or silicon oxide ($SiO_2$). Further, a film thickness of the second insulating layer 11e is preferably not less than 150 nm and not greater than 500 nm. Here, the thicker the film thickness of the second insulating layer 11e, the greater the insulating performance between the pixel electrode 16 and the touch sensor line 14. In this regard, the film thickness of the second insulating layer 11e is preferably 150 nm or greater. However, as a disadvantage of making the thickness thicker, patterning becomes difficult, and thus the film thickness of the second insulating layer 11e is preferably 500 nm or less. Further, because the film thicknesses of the first insulating layer 11d and the second insulating layer 11e can be adjusted independently, it is easy to achieve both touch panel performance and a panel transmittance design. Then, in order to form the first insulating layer 11d and the second insulating layer 11e, it is not necessary to use a special process, making it possible to improve the yield of the display panel 1.

Further, a portion of the second insulating layer 11e is formed in the opening 63 of the first insulating layer 11d and is in contact with the common electrode 13. Then, a recessed portion 70 recessed downward into a portion 63a above the opening 63 is formed in the second insulating layer 11e. As a result, a distance D1 from a bottom face of the recessed portion 70 to an upper face of the common electrode 13 is smaller than a distance D2 from an upper face of the second insulating layer 11e to the upper face of the common electrode 13 in a portion 63b different from the portion 63a of the second insulating layer 11e. Further, in the second insulating layer 11e, the opening 65 in which a second portion 16c of the pixel electrode 16 is disposed is formed above the connecting electrode 15.

The pixel electrode 16 is formed in an upper layer of the second insulating layer 11e. As a result, the common electrode 13 is disposed between the data line 12 and the pixel electrode 16, and thus noise from the data line 12 is shielded by the common electrode 13. As a result, the noise from the data lines 12 can be prevented from reaching the pixel electrode 16. Then, because noise can be prevented from reaching the pixel electrode 16, an area of the pixel electrode 16 can be increased. As a result, the light transmittance of the display panel 1 can be improved. Further, because the first insulating layer 11d is disposed between the touch sensor line 14 and the common electrode 13, the parasitic capacitance between the touch sensor line 14 and the common electrode 13 can be reduced. Further, the pixel electrode 16 is formed of, for example, a transparent conductive film (ITO, for example).

Further, at least a portion of the pixel electrode 16 (first portion 16b) is disposed in the recessed portion 70 of the second insulating layer 11e. As a result, a distance between the first portion 16b of the pixel electrode 16 and the common electrode 13 is the distance D1, which is smaller than the distance D2 described above. Furthermore, the plurality of slits 16a provided in the pixel electrode 16 are all disposed in the recessed portion 70 of the second insulating layer 11e. According to this configuration, the electrical field effect produced through the slits 16a between the first portion 16b of the pixel electrode 16 and the common electrode 13 can be increased to the extent that the distance D1 between the first portion 16b of the pixel electrode 16 and the common electrode 13 is small. As a result, the light transmittance of the display panel 1 can be improved. Note that the entire region of the plurality of slits 16a provided in the pixel electrode 16 is more preferably disposed in the recessed portion 70 of the second insulating layer 11e, but the slit 16a does not necessarily have to be disposed in the recessed portion 70 of the second insulating layer 11e in a region that does not substantially contribute to the display, for example, in a region where the slit 16a and the black matrix 22 overlap in a plan view.

The second portion 16c of the pixel electrode 16 is connected to the drain electrode 17 of the thin film transistor 50 via the connecting electrode 15. Further, a portion of the second portion 16c is disposed in the opening 65 of the second insulating layer 11e and is in contact with the upper electrode layer 15b of the connecting electrode 15. According to this configuration, the connecting electrode 15 for connecting the drain electrode 17 and the pixel electrode 16 can be formed in conjunction with the process of forming the touch sensor line 14 (steps S11 and S12 described below). As a result, the number of processes for connecting the thin film transistor 50 and the pixel electrode 16 can be reduced.

Manufacturing Method of Display Panel with Touch Sensor Function

Figure 10:
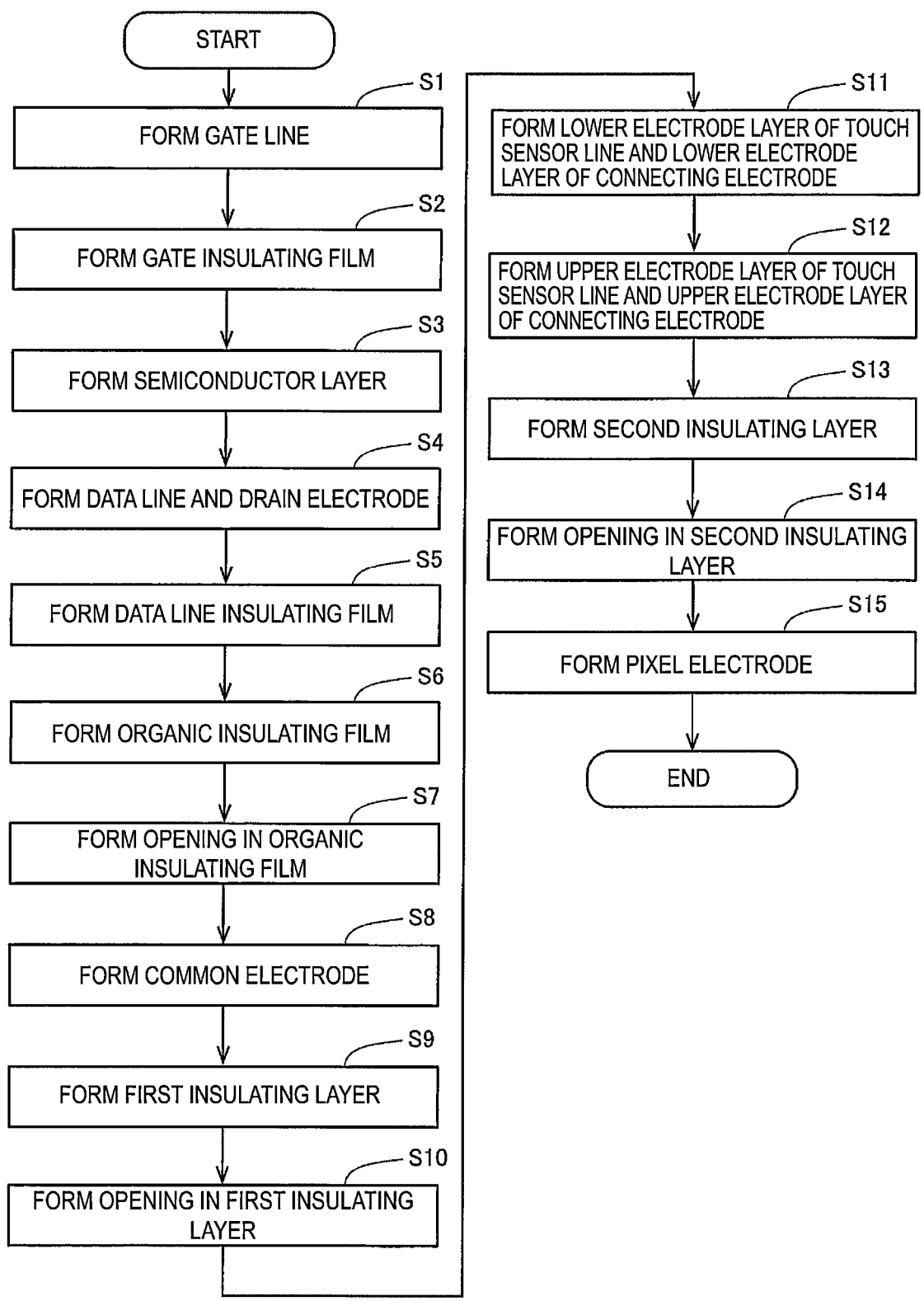
FIG. 10 is a flowchart illustrating a manufacturing process of the display panel according to the first embodiment.

Next, a manufacturing method of the display panel 1 according to the first embodiment will be described with reference to FIG. 10. FIG. 10 illustrates a flowchart of each manufacturing process of the display panel 1.

In step S1, the gate lines 18 are formed on the glass substrate 10a. In step S2, the gate insulating layer 11a is formed covering the gate lines 18.

In step S3, a semiconductor layer 51 is formed in an upper layer of the gate insulating layer 11a and, in step S4, the data lines 12 and the drain electrode 17 are formed in an upper layer of the semiconductor layer 51. In step S5, the data line insulating layer 11b is formed covering the data lines 12 and the drain electrode 17.

In step S6, the organic insulating layer 11c is formed on the data line insulating layer 11b. In step S7, the opening 62 is formed in a portion of the organic insulating layer 11c above the drain electrode 17.

In step S8, the common electrode 13 is formed on the organic insulating layer 11c. In step S9, the first insulating layer 11d is formed covering at least a portion of the common electrode 13 and filling the opening 62.

Then, in the first embodiment, in step S10, the opening 63 is formed in a portion of the first insulating layer 11d between the common electrode 13 and the pixel electrode 16. Further, in this step S10, the opening 61a is formed in a portion of the data line insulating layer 11b above the drain electrode 17, and the opening 61b is formed in a portion of the first insulating layer 11d above the drain electrode 17. Further, in this step S10, the opening 64 is formed above the common electrode 13 in the first insulating layer 11d.

In step S11, the lower electrode layer 14a of the touch sensor line 14 is formed in an upper layer of a portion of the first insulating layer 11d and in the opening 64 in the first insulating layer 11d. In this step S11, the lower electrode layer 15a of the connecting electrode 15 is formed in an upper layer of a portion of the first insulating layer 11d, in the opening 61a in the data line insulating layer 11b, and in the opening 61b of the first insulating layer 11d.

In step S12, the upper electrode layer 14b of the touch sensor line 14 is formed on the lower electrode layer 14a. As a result, the touch sensor line 14 that connects the touch sensor line 14 and the common electrode 13 through the opening 64 is formed. Further, in this step S12, the upper electrode layer 15b of the connecting electrode 15 is formed on the lower electrode layer 15a. As a result, the connecting electrode 15 that connects the drain electrode 17 and the pixel electrode 16 through the openings 61a and 61b is formed.

In step S13, the second insulating layer 11e is formed covering at least a portion of the touch sensor line 14 and at least a portion of the connecting electrode 15. Further, in this step S13, a portion of the second insulating layer 11e is formed in the opening 63 of the first insulating layer 11d, and this portion of the second insulating layer 11e is in contact with the common electrode 13. Then, the second insulating layer 11e is formed in the opening 63 of the first insulating layer 11d, thereby forming the recessed portion 70 recessed downward into the portion 63a above the opening 63.

In step S14, the opening 65 is formed above the connecting electrode 15 in the second insulating layer 11e. In step S15, the pixel electrode 16 is formed in an upper layer of the second insulating layer 11e. In this step S15, at least a portion of the pixel electrode 16 (first portion 16b) is disposed in the recessed portion 70 of the second insulating layer 11e. Further, in this step S15, the second portion 16c of the pixel electrode 16 is formed in an upper layer of the second insulating layer 11e and above the connecting electrode 15. A portion of the second portion 16c is disposed in the opening 65 of the second insulating layer 11e. In this manner, the active matrix substrate 10 is manufactured. Subsequently, the active matrix substrate 10, the counter substrate 20, and the liquid crystal layer 30 are combined, thereby completing the display panel 1.

According to the manufacturing method described above, noise from the data line 12 can be prevented from reaching the pixel electrode 16, and the parasitic capacitance between the touch sensor line 14 and the common electrode 13 can be reduced. Then, at least a portion of the pixel electrode 16 is formed in the recessed portion 70, making it possible to reduce the distance D1 between the pixel electrode 16 disposed in the recessed portion 70 and the common electrode 13 and thus produce a strong electrical field effect. As a result, the light transmittance of the display panel 1 can be improved.

Modified Example of First Embodiment

Figure 11:
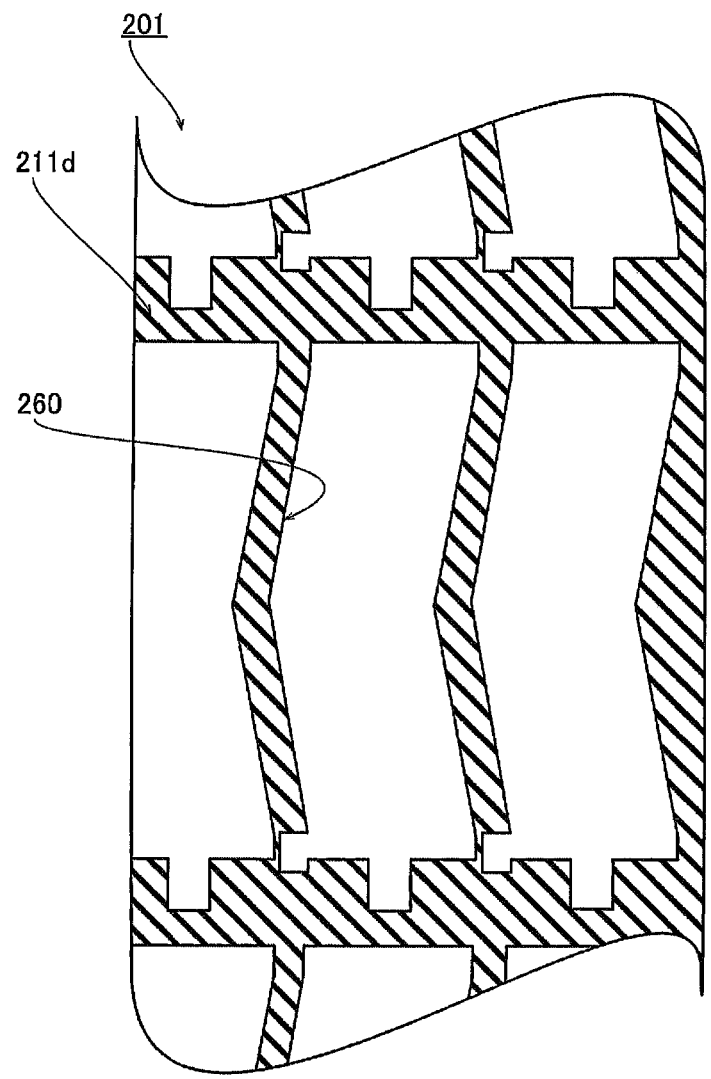
FIG. 11 is a diagram illustrating a configuration of a display panel according to a modified example of the first embodiment.

Next, a configuration and a manufacturing method of a display panel 201 with a touch sensor function, which is a modified example of the display panel 1 according to the first embodiment, will be described with reference to FIG. 11. In the first embodiment described above, the openings 61b, 63, and 64 provided in the first insulating layer 11d are formed separately in plan view. However, as illustrated in FIG. 11, an integral opening 260 is formed in a first insulating layer 211d of the display panel 201 of the present modified example. That is, in step S10 in the manufacturing method of the first embodiment described above, one opening 260 is formed. According to this configuration and manufacturing method, the number of openings formed in the first insulating layer 211d is reduced, making it possible to simplify the configuration of the display panel 201.

Second Embodiment

Next, a configuration of a display device 300 including a display panel 301 with a touch sensor function (hereinafter referred to as "display panel 301") according to a second embodiment will be described with reference to FIG. 12 to FIG. 14. In the display device 300 according to the second embodiment, unlike the configuration of the first embodiment in which, in the width direction (X direction), the entire portion of the pixel electrode 16 excluding the second portion 16c, which is the connecting portion with the connecting electrode 15, is disposed in the recessed portion 70, a first portion 316b of a pixel electrode 316 is disposed in the recessed portion 370, and a third portion 316a of the pixel electrode 316 is disposed outside the recessed portion 370, at a position between the recessed portion 370 and the touch sensor line 14 in plan view. Note that, in the following description, when the same reference numerals as in the first embodiment are used, the same configurations as in the first embodiment are indicated, and reference is made to the preceding description unless otherwise described.

Configuration of Display Device According to Second Embodiment

Figure 12:
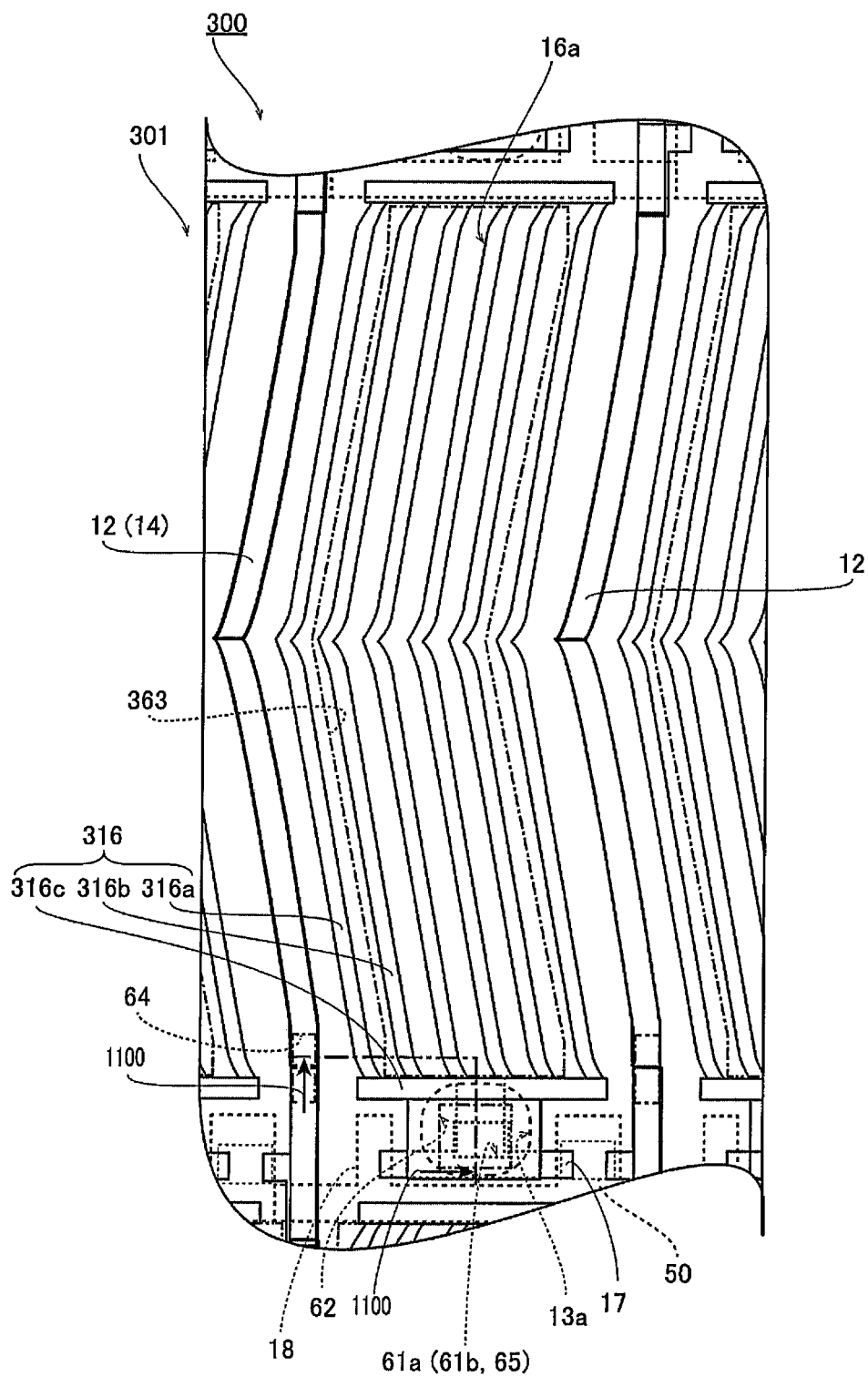
FIG. 12 is a plan view illustrating a portion of a configuration of a display panel of a display device according to a second embodiment.
Figure 13:
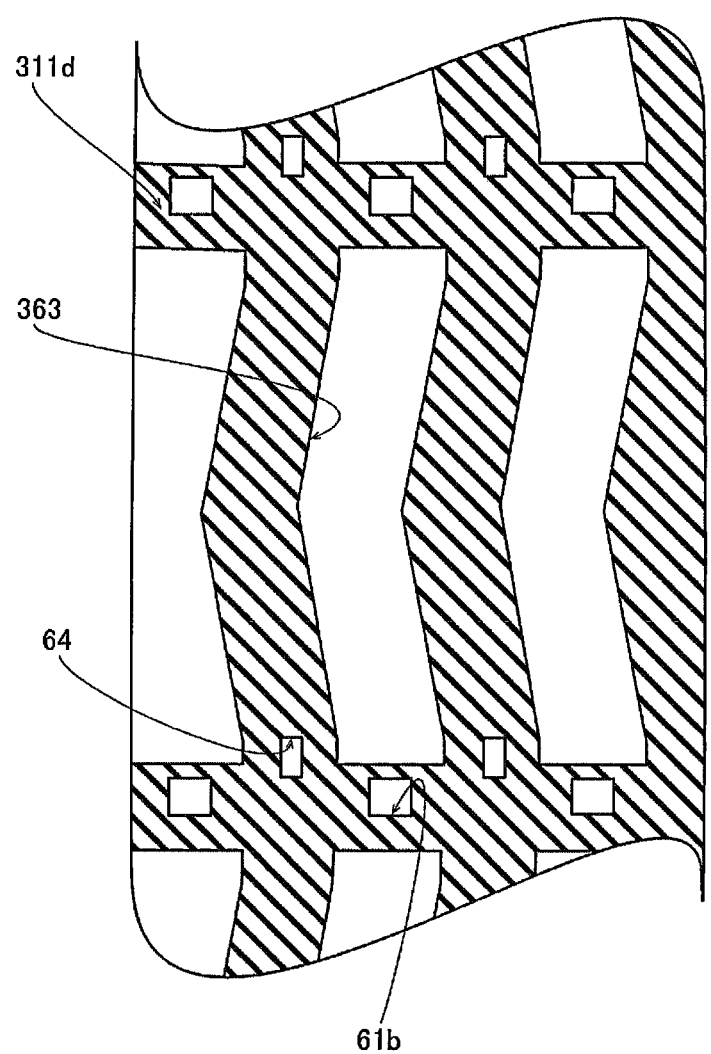
FIG. 13 is a plan view of a first insulating layer according to the second embodiment.

FIG. 12 is a plan view of a portion of the display panel 301 of the display device 300. FIG. 13 is a plan view of a first insulating layer 311d of the display panel 301. As illustrated in FIG. 13, the display panel 301 is provided with the pixel electrode 316 and an opening 363 formed in the first insulating layer 311d.

Figure 14:
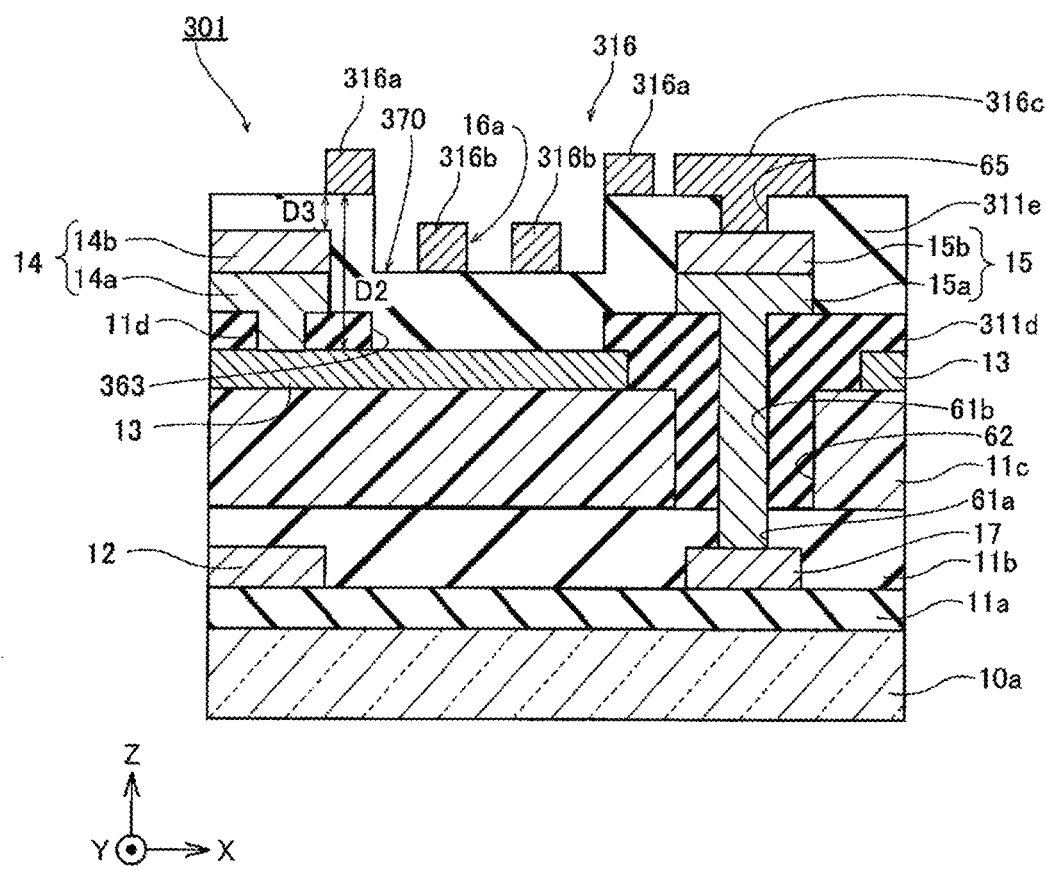
FIG. 14 is a cross-sectional view taken along the line 1100-1100 in FIG. 12.

FIG. 14 is a cross-sectional view taken along the line 1100-1100 in FIG. 12. The pixel electrode 316 of the display panel 301 includes the first portion 316b, a second portion 316c, and the third portion 316a. The first portion 316b is disposed in the recessed portion 370 of a second insulating layer 311e. The second portion 316c is formed above the connecting electrode 15. The third portion 316a is formed in an upper layer of the second insulating layer 311e, at a position between the recessed portion 370 and the touch sensor line 14 and at a position between the recessed portion 370 and the connecting electrode 15.

Here, a distance D3 between the third portion 316a and the touch sensor line 14 is smaller than the distance D2 between the third portion 316a (upper face of the second insulating layer 11e) and the common electrode 13. Here, during the period when the pixel electrode 316 is driven, a signal (COM signal) supplied to the common electrode 13 is supplied to the touch sensor line 14 as well, and thus the touch sensor line 14 and the common electrode 13 are at the same potential, and the touch sensor line 14 functions as a portion of the common electrode 13. As a result, an electrical field for driving the liquid crystal of the liquid crystal layer 30 is generated between the third portion 316a and the touch sensor line 14.

According to the configuration of the second embodiment described above, the area of the pixel electrode 316 can be made larger compared to a case in which the pixel electrode 316 is formed only in the recessed portion 370. Further, even when the distance D2 between the third portion 316a of the pixel electrode 316 and the common electrode 13 is long, an electrical field is generated between the third portion 316a and the touch sensor line 14, making it possible to further improve the light transmittance of the display panel 301 (liquid crystal layer 30). Note that the other configurations and effects of the display device 300 according to the second embodiment are the same as the configurations and effects of the display device 100 according to the first embodiment.

Manufacturing Method of Display Panel According to Second Embodiment

In the manufacturing method of the display panel 301 according to the second embodiment, in step S15 in the manufacturing process of the display panel 1 according to the first embodiment illustrated in FIG. 10, the third portion 316a of the pixel electrode 316 is formed in an upper layer of the second insulating layer 11e, between the recessed portion 370 and the touch sensor line 14 in plan view, in addition to formation of the first portion 316b of the pixel electrode 316 in the recessed portion 370. Note that the other manufacturing processes of the display panel 301 according to the second embodiment are the same as the manufacturing processes of the display panel 1 according to the first embodiment.

Modified Example of Second Embodiment

Figure 15:
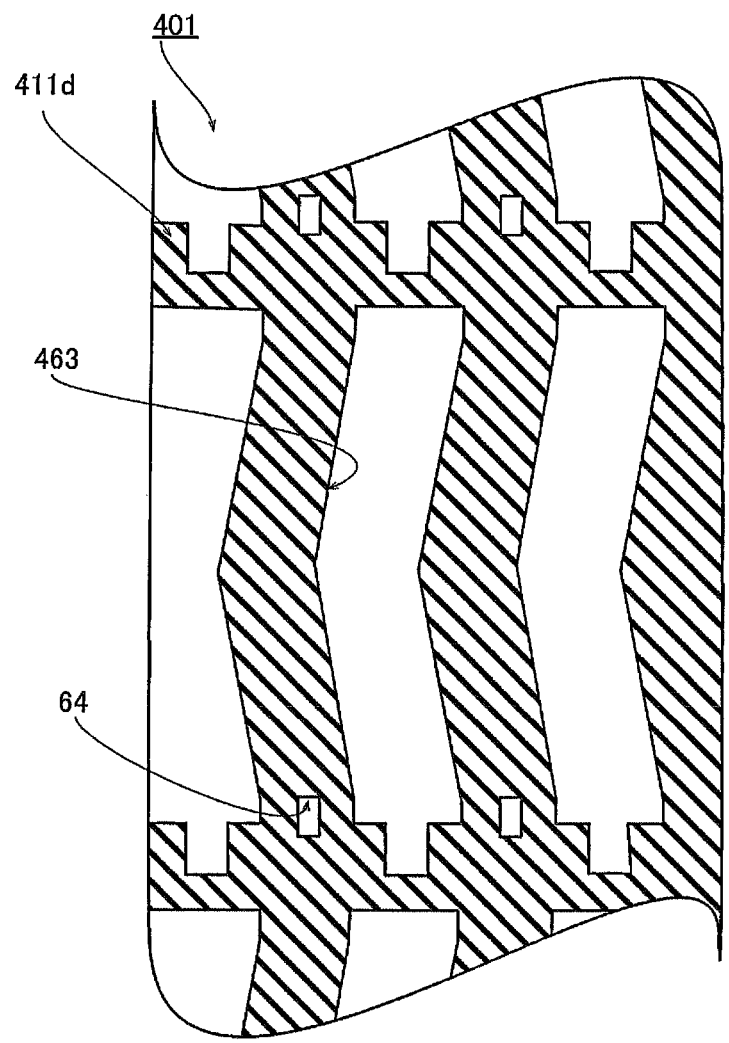
FIG. 15 is a diagram illustrating a configuration of a display panel according to a modified example of the second embodiment.

Next, a configuration and a manufacturing method of a display panel 401 with a touch sensor function, which is a modified example of the display panel 301 according to the second embodiment, will be described with reference to FIG. 15. As illustrated in FIG. 13, in the second embodiment described above, the opening 61b and the opening 363 provided in the first insulating layer 311d are formed separately in plan view. However, as illustrated in FIG. 15, an integral opening 463 is formed in a first insulating layer 411d of the display panel 401 of the present modified example. That is, in step S10 in the manufacturing method of the first embodiment, the integral opening 463 is formed. According to this configuration and manufacturing method, the number of openings formed in the first insulating layer 411d is reduced, making it possible to simplify the configuration of the display panel 401.

Modifications and the Like

The above-described embodiments are merely examples for carrying out the present disclosure. Accordingly, the present disclosure is not limited to the embodiments described above and can be implemented by modifying the embodiments described above as appropriate without departing from the scope of the present disclosure.

For example, in the first and second embodiments described above, examples are illustrated in which the first insulating layer and the second insulating layer are constituted by an inorganic insulating film, but the present disclosure is not limited to such examples. That is, the first insulating layer and the second insulating layer may be constituted by an organic insulating film. Further, the first insulating layer and the second insulating layer may be configured by layering a plurality of inorganic insulating films, such as by layering silicon nitride (SiNx) and silicon oxide (SiO2), for example.

Further, in the first and second embodiments described above, examples are given of the materials of the data line, the common electrode, the touch sensor line, the first connecting electrode, the second connecting electrode, and the pixel electrode, but the present disclosure is not limited to those materials. The data line, the common electrode, the touch sensor line, the first connecting electrode, the second connecting electrode, and the pixel electrode may be configured using materials other than the materials described above.

Further, although an example in which the touch sensor line is constituted by two layers is illustrated in the first and second embodiments described above, the present disclosure is not limited to this example. That is, the touch sensor line may be constituted by a single layer, or may be configured as a layered film of three or more layers.

Further, although an example in which the width W6 of the data line is not greater than the width W1 of the touch sensor line is illustrated in the first to second embodiments described above, the present disclosure is not limited to this example. That is, the width of the data line may be greater than the width of the touch sensor line.

Further, the display panel with a touch sensor function and the manufacturing method of a display panel with a touch sensor function described above can be described as follows.

A display panel with a touch sensor function according to a first configuration includes a data line, a common electrode formed in an upper layer above the data line, a first insulating layer covering at least a portion of the common electrode, a touch sensor line formed in an upper layer of the first insulating layer and in a first opening provided in the first insulating layer, and connected to the common electrode via the first opening, a second insulating layer covering at least a portion of the touch sensor line, and a pixel electrode formed in an upper layer of the second insulating layer. The first insulating layer is formed with a second opening between the common electrode and the pixel electrode, the second insulating layer is disposed in an interior of the second opening, and the second insulating layer is formed with a recessed portion recessed downward into a portion above the second opening, and at least a portion of the pixel electrode is disposed in the recessed portion of the second insulating layer
(First Configuration).

According to the first configuration described above, the common electrode is disposed between the data line and the pixel electrode, and thus noise from the data line is shielded by the common electrode. This makes it possible to prevent noise from the data line from reaching the pixel electrode. Then, because noise can be prevented from reaching the pixel electrode, an area of the pixel electrode can be increased. As a result, the light transmittance of the display panel can be improved. Then, because the first insulating layer is disposed between the touch sensor line and the common electrode, the parasitic capacitance between the touch sensor line and the common electrode can be reduced. Then, at least a portion of the pixel electrode is disposed in the recessed portion of the second insulating layer, making it possible to reduce a distance between the pixel electrode disposed in the recessed portion and the common electrode and thus produce a strong electrical field effect. As a result, the light transmittance of the display panel can be improved.

In the first configuration, the pixel electrode may be provided with a slit, and the slit may be formed in the pixel electrode disposed in the recessed portion of the second insulating layer. Second Configuration According to the second configuration described above, in the display panel in which the pixel electrode is provided with a slit, the distance between the pixel electrode disposed in the recessed portion and the common electrode can be reduced, making it possible to strengthen the electrical field effect produced between the pixel electrode and the common electrode through the slit. As a result, the light transmittance of the display panel that drives liquid crystal by utilizing a transverse electrical field generated at the slit portion can be improved.

In the first or second configuration, the touch sensor line may include a first touch sensor layer and a second touch sensor layer formed in a lower layer of the first touch sensor layer and having a light reflectivity less than a reflectivity of the first touch sensor layer (Third configuration).

According to third configuration described above, the light reflectance at the second touch sensor layer can be reduced, making it possible to suppress multiple reflection between the data line and the touch sensor line of light (backlight) incident from below the display panel. As a result, unnecessary coloring (color mixing) can be prevented when the display panel is viewed obliquely from above. Thus, the size of the black matrix required for color mixing prevention can be reduced, and the light transmittance of the display panel can be further improved without reducing display quality.

In any one of the first to third configurations, the display panel with a touch sensor function may further include a drain electrode formed in the same layer as a layer of the data line, and a connecting electrode configured to connect the drain electrode and the pixel electrode. The first insulating layer may be formed with a third opening above the drain electrode, and the connecting electrode may be formed in the third opening in the same layer as a layer of the touch sensor line (Fourth configuration).

According to the fourth configuration described above, the connecting electrode for connecting the drain electrode to the pixel electrode can be formed in conjunction with formation of the touch sensor line. As a result, the number of processes for connecting the drain electrode to the pixel electrode can be reduced.

In the fourth configuration, at least two of the first opening, the second opening, and the third opening of the first insulating layer may be continuously formed in plan view (Fifth configuration).

According to the fifth configuration described above, the number of openings formed in the first insulating layer is reduced, making it possible to simplify the configuration of the first insulating layer.

In any one of the configurations of the first to fifth configurations, the touch sensor line may be formed in a linear shape and, in a width direction of the touch sensor line, the touch sensor line may have a length less than or equal to a length of the first insulating layer (Sixth configuration).

According to the sixth configuration described above, when the touch sensor line is formed on the first insulating layer, a shift in the touch sensor line can be absorbed to the extent that the length (width) of the first insulating layer is long (large). That is, the touch sensor line can be easily aligned.

In any one of the configurations of the first to sixth configurations, the touch sensor line may be formed in a linear shape, the data line may be formed parallel to the touch sensor line and in a linear shape and, in a width direction of the data line, the data line may have a length less than or equal to a length of the touch sensor line (Seventh configuration).

According to the seventh configuration described above, the length (width) of the data line is short (small), making it difficult for multiple reflection to occur between the touch sensor line and the data line. As a result, unnecessary light transmission is reduced, making it possible to improve the light transmittance of the display panel.

In any one of the first to seventh configurations, the pixel electrode may be formed in the recessed portion as well as in an upper layer of the second insulating layer, between the recessed portion and the touch sensor line, in plan view (Eighth configuration).

According to the eighth configuration described above, the area of the pixel electrode can be made larger compared to a case in which the pixel electrode is formed only in the recessed portion. Here, during the period when the pixel electrode is driven, a signal supplied to the common electrode is supplied to the touch sensor line as well (the touch sensor line and the common electrode are at the same potential), and thus the touch sensor line functions as a portion of the common electrode. As a result, an electrical field is generated between the pixel electrode formed in an upper layer of the second insulating layer and the touch sensor line formed in an upper layer above the second insulating layer. Thus, even in a case in which the distance between the portion of the pixel electrode formed in an upper layer of the second insulating layer and the common electrode is long, an electrical field is generated between the portion formed in the upper layer of the second insulating layer and the touch sensor line, making it possible to further improve the light transmittance of the display panel (liquid crystal layer).

A manufacturing method of a display panel with a touch sensor function according to a ninth configuration includes forming a data line on a substrate, forming a common electrode in an upper layer above the data line, forming a first insulating layer covering at least a portion of the common electrode, forming a first opening and a second opening in the first insulating layer, forming a touch sensor line in an upper layer of the first insulating layer and in the first opening provided in the first insulating layer and thus connecting the touch sensor line and the common electrode through the first opening, forming a second insulating layer covering at least a portion of the touch sensor line and in the second opening and thus forming a recessed portion in a portion above the second opening, and forming a pixel electrode in an upper layer of the second insulating layer with at least a portion of the pixel electrode being disposed in the recessed portion of the second insulating layer (Ninth configuration).

According to the ninth configuration described above, as with the first configuration described above, noise from the data line can be prevented from reaching the pixel electrode, and the parasitic capacitance between the touch sensor line and the common electrode can be reduced. Then, at least a portion of the pixel electrode is formed in the recessed portion of the second insulating layer, making it possible to reduce a distance between the pixel electrode disposed in the recessed portion and the common electrode, and thus produce a strong electrical field effect. As a result, the light transmittance of the display panel can be improved.

In the ninth configuration, the manufacturing method may further include forming a third opening after the formation of the first insulating layer and before the formation of the touch sensor line. The formation of the data line may further include forming a drain electrode, the third opening may be formed above the drain electrode in the first insulating layer, the formation of the touch sensor line may further include forming a connecting electrode connected to the drain electrode in the same layer as a layer of the touch sensor line, and the formation of the pixel electrode may include forming the pixel electrode with the pixel electrode connected to the connecting electrode (Tenth configuration).

According to the tenth configuration described above, the connecting electrode for connecting the drain electrode to a member in an upper layer can be formed in conjunction with the process of forming the touch sensor line. As a result, the number of processes for connecting the drain electrode to the pixel electrode can be reduced.

In the tenth configuration, the formation of the first opening and the second opening and the formation of the third opening may be executed in the same process (Eleventh configuration).

According to the eleventh configuration described above, the number of processes can be reduced.

In any one of the ninth to eleventh configurations, the formation of the pixel electrode may be forming the pixel electrode in the recessed portion as well as in an upper layer of the second insulating layer, between the recessed portion and the touch sensor line, in plan view (Twelfth configuration).

According to the twelfth configuration described above, the area of the pixel electrode can be made larger compared to a case in which the pixel electrode is formed only in the recessed portion. Further, similar to the eighth configuration described above, the light transmittance of the display panel (liquid crystal layer) can be further improved.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A display panel with a touch sensor function comprising:
   a data line;
   a common electrode formed in an upper layer above the data line;
   a first insulating layer covering at least a portion of the common electrode;
   a touch sensor line formed in an upper layer of the first insulating layer and in a first opening provided in the first insulating layer, and connected to the common electrode via the first opening;
   a second insulating layer covering at least a portion of the touch sensor line; and
   a pixel electrode formed in an upper layer of the second insulating layer,
   wherein the first insulating layer is formed with a second opening between the common electrode and the pixel electrode,
   the second insulating layer is disposed in an interior of the second opening, and formed with a recessed portion recessed downward into a portion above the second opening,
   at least a portion of the pixel electrode is disposed in the recessed portion of the second insulating layer; and
   the pixel electrode is formed in the recessed portion as well as in an upper layer of the second insulating layer, between the recessed portion and the touch sensor line, in plan view.

2. The display panel with a touch sensor function according to claim 1,
wherein the pixel electrode is provided with a slit, and
the slit is formed in the pixel electrode disposed in the recessed portion.

3. The display panel with a touch sensor function according to claim 1,
wherein the touch sensor line includes
a first touch sensor layer, and
a second touch sensor layer formed in a lower layer of the first touch sensor layer and having a light reflectivity less than a light reflectivity of the first touch sensor layer.

4. The display panel with a touch sensor function according to claim 1, further comprising:
a drain electrode formed in the same layer as a layer of the data line; and
a connecting electrode connecting the drain electrode and the pixel electrode,
wherein the first insulating layer is formed with a third opening above the drain electrode, and
the connecting electrode is formed in the third opening in the same layer as a layer of the touch sensor line.

5. The display panel with a touch sensor function according to claim 4,
wherein at least two of the first opening, the second opening, and the third opening of the first insulating layer are continuously formed in plan view.

6. The display panel with a touch sensor function according to claim 1,
wherein the touch sensor line is formed in a linear shape, and
in a width direction of the touch sensor line, the touch sensor line has a length less than or equal to a length of the first insulating layer.

7. The display panel with a touch sensor function according to claim 1,
wherein the touch sensor line is formed in a linear shape,
the data line is formed parallel to the touch sensor line and in a linear shape, and
in a width direction of the data line, the data line has a length less than or equal to a length of the touch sensor line.

8. A manufacturing method of a display panel with a touch sensor function, the manufacturing method comprising:
forming a data line on a substrate;
forming a common electrode in an upper layer above the data line;
forming a first insulating layer covering at least a portion of the common electrode;
forming a first opening and a second opening in the first insulating layer;
forming a touch sensor line in an upper layer of the first insulating layer and in the first opening provided in the first insulating layer and thus connecting the touch sensor line and the common electrode through the first opening;
forming a second insulating layer covering at least a portion of the touch sensor line and in the second opening and thus forming a recessed portion in a portion above the second opening; and
forming a pixel electrode in an upper layer of the second insulating layer with at least a portion of the pixel electrode being disposed in the recessed portion of the second insulating layer; wherein
the formation of the pixel electrode is forming the pixel electrode in the recessed portion as well as in an upper layer of the second insulating layer, between the recessed portion and the touch sensor line, in plan view.

9. The manufacturing method of a display panel with a touch sensor function according to claim 8, the manufacturing method further comprising:
forming a third opening after the formation of the first insulating layer and before the formation of the touch sensor line,
wherein the formation of the data line further includes forming a drain electrode,
the third opening is formed above the drain electrode in the first insulating layer,
the formation of the touch sensor line further includes forming a connecting electrode connected to the drain electrode in the same layer as a layer of the touch sensor line, and
the formation of the pixel electrode includes forming the pixel electrode with the pixel electrode connected to the connecting electrode.

10. The manufacturing method of a display panel with a touch sensor function according to claim 9,
wherein the formation of the first opening and the second opening and the formation of the third opening are executed in the same process.

* * * * *